Jan. 7, 1969  G. E. MEVERS ET AL  3,420,600
INTERFEROMETRIC OPTICAL MODULATOR
Filed Oct. 26, 1964  Sheet 1 of 2
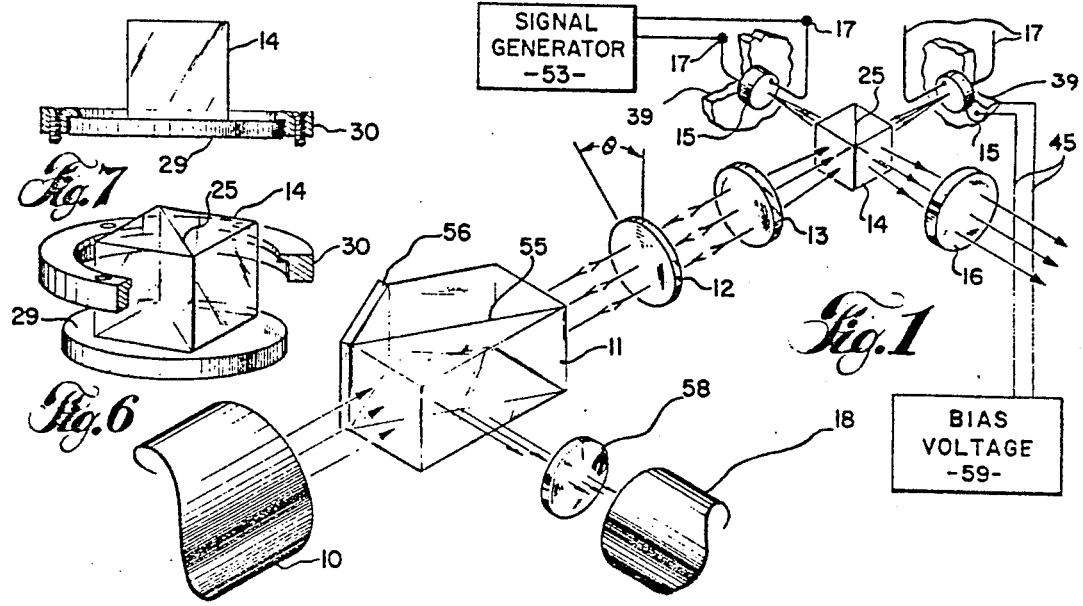
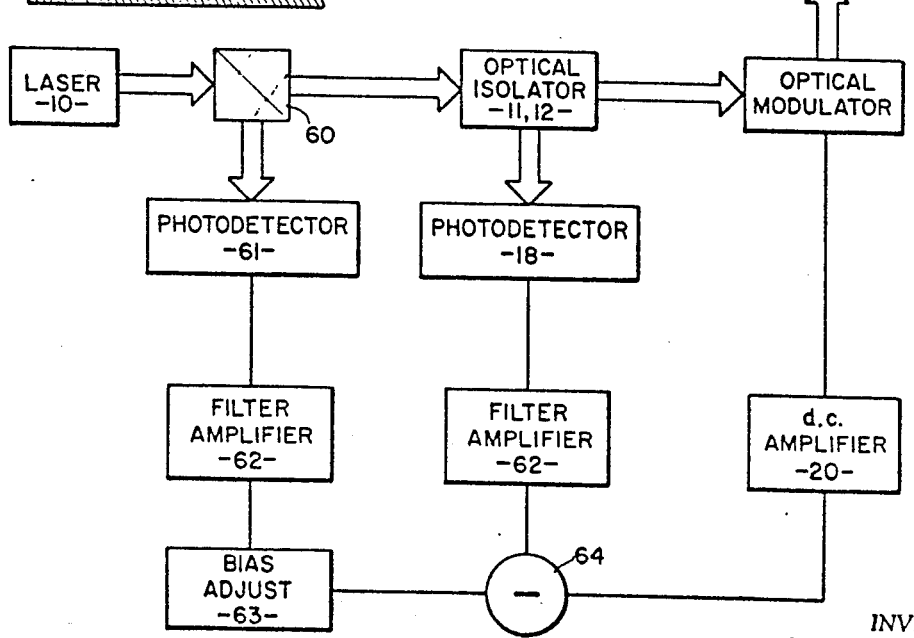
INVENTORS
GUS E. MEVERS
DAVID B. POLLOCK
BY Richard D. Seibel
ATTORNEY Jan. 7, 1969  G. E. MEVERS ET AL  3,420,600
INTERFEROMETRIC OPTICAL MODULATOR
Filed Oct. 26, 1964  Sheet 2 of 2
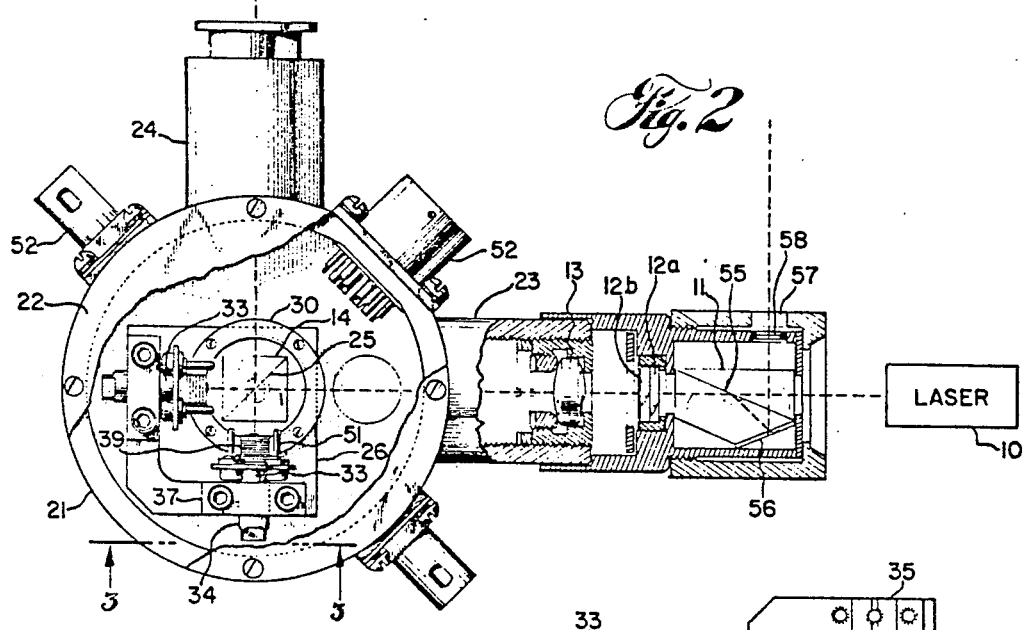
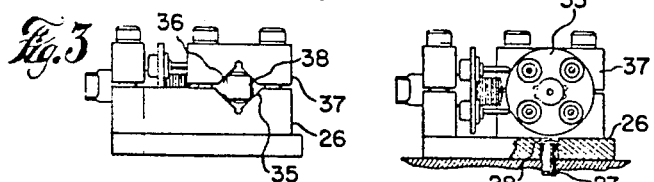
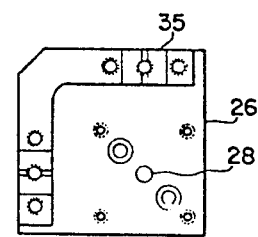
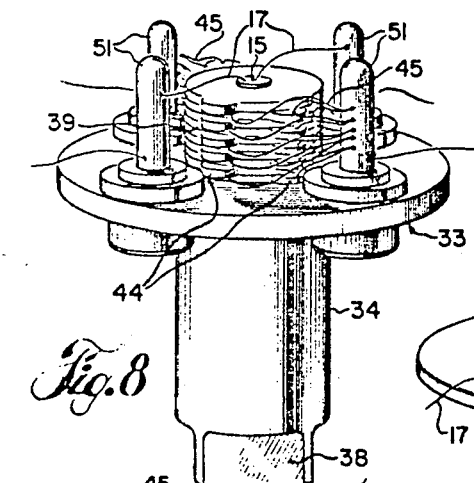
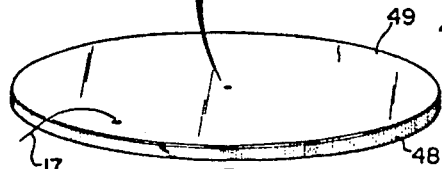
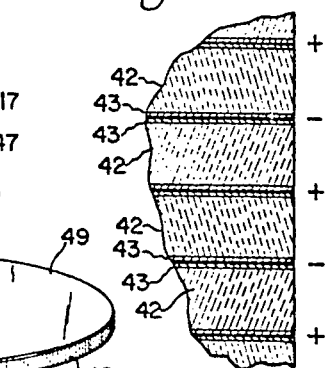
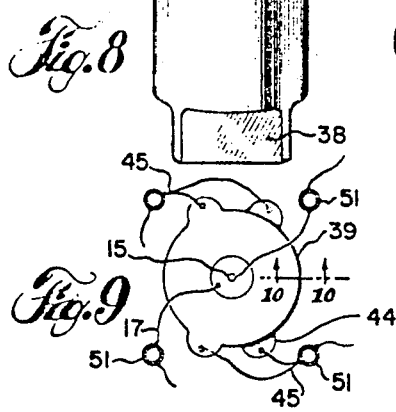
INVENTORS
GUS E. MEVERS
DAVID B. POLLOCK
BY Richard D. Seibel
ATTORNEY 3,420,600
INTERFEROMETRIC OPTICAL MODULATOR
Gus E. Meyers, Redondo Beach, and David B. Pollock, Huntington Beach, Calif., assignors to North American Rockwell Corporation, a corporation of Delaware
Filed Oct. 26, 1964, Ser. No. 406,424
U.S. Cl. 350—150        17 Claims
Int. Cl. G02f 1/26; H04b 9/00

ABSTRACT OF THE DISCLOSURE

An interferometer is described for amplitude modulating a light beam by varying the path length in the interferometer in accordance with a signal on a piezoelectric transducer. An optical isolator is provided between the modulator and a laser providing the input light beam for minimizing the effect of reflected light on the laser. In a preferred embodiment the optical isolator comprises a Foster-Seeley prism and a quarter wave plate for polarizing the light and rejecting reflected light. A second quarter wave plate may be employed for providing a second output light beam from the modulator having polarization distinct from polarization of the principal modulator output beam. A feedback arrangement is also provided for stabilizing operation of the modulator.

---

In the use of a laser in conjunction with an interferometric light modulator for amplitude modulating a light beam, it has been found that intensity fluctuations occur in the laser output. It has been found that these intensity fluctuations are superimposed on the desired amplitude modulation and interfere with the information carrying of the light beam.

In addition to amplitude modulation of light it is often desired to use other forms of modulation for transmitting information in digital rather than analog form. For this purpose, it is convenient to alter the state of polarization of the light to signify either of two values.

It is therefore a broad object of this invention to provide a means for minimizing intensity fluctuations in a coherent light system.

It is another broad object of this invention to polarization modulate light.

It has been found that undesired fluctuations in intensity can be minimized by preventing reflected light from an optical modulator from returning to the laser. In order to prevent return of reflected light an optical isolator is introduced into the optical circuit between the laser and the light modulator.

Thus in the practice of this invention according to a preferred embodiment there is provided a continuous wave laser as a source of coherent light, a polarizer-analyzer for plane polarizing the light from the laser and a quarter wave retardation plate having an optic axis suitably oriented to the transmission axis of the polarizer for circularly polarizing the light. Light passing through the polarizer and retardation plate is operated on by an interferometric optical modulator to provide a circularly polarized amplitude modulated output light beam. The modulator also reflects light back toward the laser. However, the combination of retardation plate and polarizer-analyzer restricts the reflected beam from interfering with the light from the laser by diverting all of the reflected light from the modulator before it reaches the laser. The light diverted from the polarizer-analyzer is again circularly polarized by a retardation plate for providing a second output beam of opposite handedness of polarization from the polarization of the first output beam. The interferometric modulator is readily switched from destructive to constructive interference to switch from one to the other light beam and provide digital information transmission.

Thus it is a broad object of this invention to provide a means for minimizing reflection.

It is another object of this invention to minimize intensity fluctuation in a laser.

It is a further object of this invention to provide an improved optical modulator.

It is another object of this invention to provide signals corresponding to light intensity.

It is still another object of this invention to polarization modulate light.

Other objects and many of the attendant advantages of this invention will be readily appreciated as the same becomes better understood by reference to the following detailed description when considered in connection with the accompanying drawings wherein:

FIG. 1 illustrates in schematic form an optical system embodying the principles of this invention;

FIG. 2 illustrates a preferred embodiment of an optical modulator;

FIG. 3 is a side view of a portion of the modulator of FIG. 2 illustrating a platform assembly on which optical elements are mounted;

FIG. 4 is another side view of the platform assembly of FIG. 3;

FIG. 5 is a top view of the platform of FIG. 3;

FIG. 6 is a partially exploded perspective view of a beam splitter employed in the optical modulator of FIG. 2;

FIG. 7 is a partial sectional view of the beam splitter of FIG. 6;

FIG. 8 is a perspective view of a pedestal assembly employed in the modulator of FIG. 2;

FIG. 9 is an end view of transducer elements on the pedestal assembly of FIG. 8;

FIG. 10 is a partial view of transducer elements of FIG. 9;

FIG. 11 is an exploded view of a portion of the transducer elements of FIG. 9;

FIG. 12 is a partial sectional view of one of the transducer elements of FIG. 9; and FIG. 13 illustraes a feedback network employed in the practice of this invention.

Throughout the drawings like reference numerals refer to like parts.

The modulator described herein illustrates certain improvements in an interference modulator described and claimed in copending U.S. patent application Ser. No. 294,585, now U.S. Patent 3,302,027, entit'ed "Light Interference Method and Apparatus," filed by David L. Fried and Wendell S. Read and assigned to North American Rockwell Corp., the assignee of this application.

Certain aspects of an apparatus constructed according to the principles of this invention are described and claimed in copending application Ser. No. 406,434, entitled, "Interferometer Alignment," filed in the names of Melvin H. French and Daniel E. Richmond and assigned to North American Rockwell Corp., the assignee of this invention.

As illustrated in FIG. 1 which depicts schematically an optical system which incorporates the principles of this invention, there is provided a laser 10 which is preferably a continuous wave gas laser for providing a monochromatic continuous beam of coherent light which may be in the ultraviolet, visible or infra-red portions of the spectrum. A typical laser for use in this invention comprises a helium-neon gas laser which has a sharp monochromatic beam with a wave length of 6328.17 Angstroms in the red region of the visible spectrum. A suitable laser light source is a continuous wave gas laser such as the Model 110 manufactured by Perkin-Elmer Spectra-Physics, Inc. A laser useful in the practice of this invention is described in U.S. Patent 2,929,922 to A. L. Schawlow, et al., entitled "Masers and Maser Communications System."

The light beam from the laser passes through an optical isolator comprising a polarizer or analyzer 11 which is preferably a Foster-Seeley prism for plane polarizing the light beam. Plane polarized light from the plane polarizer 11 then passes through a quarter wave retardation plate 12 for converting the plane polarized beam to a circularly polarized beam. If the polarization axis of the retardation plate is to the right of the axis of the plane polarizer 11, the circularly polarized beam has one handedness of polarization and if to the left, the output beam has the other handedness of polarization. The usefulness of the prism and retardation plate as a circular polarizer stems from the fact that a right-handed beam cannot pass through a left-handed circular analyzer no matter how the optical isolator may be rotated. Additionally a right-handed beam when reflected becomes a left-handed beam and thus cannot pass through the polarizer combination that originally polarized the beam.

After passing through the plane polarizer 11 and the quarter wave retardation plate 12 the circularly polarized light beam passes through a focusing lens 13 which focuses the parallel light beam from the laser. The focused light beam then passes through a beam splitter 14 which divides the beam of light into two separate beams of equal intensity. These beams impinge on reflecting surfaces of transducers 15 positioned so as to be in the focal plane of the lens 13. Light reflected from the transducer 15 is recombined in the beam splitter 14 and a portion of the recombined light passes through the collimating lens 16 which recollimates the output beam for transmission to an optical receiver. This output light beam is in a common plane with the input light beam and normal thereto. Another portion of the recombined beam passes retrodirectively through the focusing lens 13 and is thereby recollimated and directed to the optical isolator.

The beam splitter 14 and the mirror-like transducers 15 form an interferometric optical modulator. In a preferred embodiment each of the reflecting transducers 15 comprise piezoelectric elements having a reflective front surface. The rear surface of the piezoelectric transducers is substantially fixed in position except as described hereinafter and the reflective front surface is free to move. Electrical leads 17 secured to the front and back surfaces respectively of the transducers are employed to impose a varying elecrtic field across the piezoelectric material. The varying electric fields on the two transducers are suitably phased so that the front surface of one of the transducers moves toward the beam splitter as the front surface of the other transducer moves away from the beam splitter. This is accomplished either by reversing the polarity of the transducers or the polarity of the electrical connections. The resultant difference in relative path length on the legs of the interferometer causes a change between constructive and destructive interference or vice versa and varies the amplitude of the output light beam from the modulator. Both transducers are operated in suitable phase relation to reduce the displacement that would be required of a single transducer to obtain the same depth of modulation; hence the depth of modulation of the modulator is doubled for a given driving signal.

As previously mentioned a portion of the light recombined by the beam splitter 14 is recollimated by the focusing lens 13 and transmitted retrodirectively toward the laser 10. Since this returning light beam is a reflected beam the handedness of the circular polarization has been reversed and the combination of the retardation plate 12 and plane polarizer-analyzer 11 prevents passage of this reflected light beam back to the laser thereby minimizing fluctuations of the intensity of the laser output. The Foster-Seeley prism rejects the reflected beam and directs it at 90° to the transmitted beam therethrough. The reflected beam passes through a retardation plate 58, thereby becoming circularly polarized. The optic axis of the retardation plate 58 is arranged at an angle to the plane of polarization of the rejected beam so that the handedness of polarization of the beam is opposite to the handedness of the output beam from the modulator.

In the illustrated embodiment the reflected output beam is directed to a photodetector 18 for producing electrical signals corresponding to the light intensity for monitoring modulator output and providing feedback control thereof. It will be recognized that in the operation of the interference light modulator light energy is not lost except for minor absorptions in the optical elements. When the optical modulator is adjusted for maximum destructive interference in the output light beam, it is also providing maximum constructive interference in the light beam retrodirected toward the light source. Thus when the instantaneous intensity of the modulator output beam from the collimating lens 16 increases there is a corresponding decrease in the intensity of the retrodirected light beam from the focusing lens 13 and vice versa. Thus the intensity of the reflected output light beam and hence electrical signal from the photodetector 18 corresponds to the light intensity of the output light beam of the modulator, but is of exactly opposite phase. This signal is employed as feedback to insure optimum operation of the modulator, and is employed to transmit information as described more fully hereinafter.

It is also observed that undesired variations in the laser output are obtained with other optical devices causing a reflection of coherent light back into the laser. Thus, a plane polarizer and quarter wave retardation plate as an optical isolator are useful in combination with a laser for optical systems having elements other than the described modulator. Thus, for example, light beams are modulated by various electro-optic cells and a small amount of light is retrodirected thereby to the laser. Since it has been found that the continuous wave laser is particularly sensitive to small amounts of coherent light, it is preferred to employ an optical isolation with the laser to minimize amplitude variations.

In FIG. 2 there is illustrated a preferred embodiment of an optical modulator incorporating the principles of this invention. As illustrated in this embodiment there is provided a shallow cylindrical housing 21 being closed at one end and open at the other. A cover 22 is provided for the housing so as to provide a light tight enclosure. An input light tube 23 is provided on one side of the housing 21. Light from a source of coherent radiation such as a laser enters the input tube through a Foster-Seeley prism 11. The Foster-Seeley prism is a calcite prism having two pieces of calcite with the optic axes aligned so that a high rejection of light that is plane polarized perpendicular to the transmission axis of the prism is obtained. Basically it comprises a Glan-Thompson prism having one edge modified with a totally reflecting face so that the extraordinary ray is reflected back through the prism and emerges normal to the ordinary ray. A rejection greater than 10,000:1 is obtained from such a prism alone if the beam spread through the prism is limited to one arc-minute. A Foster-Seeley prism is a preferred polarizer since an alternate optical path is provided for light polarized perpendicular to the transmission axis of the prism.

A light beam entering the Foster-Seeley prism from the laser is separated into two mutually perpendicular plane polarized components by the doubly refracting or birefringent calcite of which the prism is constructed. The ordinary component of the light passes directly through a plane 55 formed by the intersection of two pieces of calcite. The extraordinary component of the beam is reflected at the plane 55 which it strikes at an angle for complete reflection, and is absorbed in an absorbent black coating on the prism of the interior of the input light tube 23. Since the light from a laser of the type mentioned is already substantially plane polarized, by proper rotation of the prism or laser relative to each other, very little light need be absorbed.

Any circularly polarized light reflected from the interferometer which is retrodirected through the focusing lens 13 is plane polarized by the quarter wave retardation plate 12. Since reflected light passes twice through the quarter wave plate, it now acts as a half wave plate and the plane of polarization is perpendicular to the plane of polarization of the light originally transmitted through the prism. This reflected light beam is therefore reflected at the plane 55 in the same manner as the extraordinary component of the input light beam and is directed to a surface 56 of the prism where a reflective coating is provided for reflecting substantially all of the light beam. This reflected light beam then passes through the plane 55 at a steep angle so that the beam is transmitted rather than reflected. The extraordinary beam then passes out of the input light tube through an aperture 57 in the side thereof. The angles of the reflecting planes of the prism are arranged so that the light beam passing through the aperture 57 is normal to the light beam transmitted through the prism. A quarter wave retardation plate 58 is provided in the aperture 57 and the plane polarized beam diverted by the prism is circularly polarized thereby in the same manner as the polarization by the retardation plate 12.

It will be readily appreciated by one skilled in the art that substitution for the Foster-Seeley prism 11 can include a Glan-Thompson, Rochon, or Nicol prism, or a linear polarizer in sheet form such as is marketed by Polaroid Corporation. Any polarizing device that provides a plane polarized light beam can be employed in apparatus constructed according to the principles of this invention; however, the Foster-Seeley prism is particularly preferred since rejected light therefrom is directed at 90° to the transmitted light beam, and is readily employed for feedback signals or for providing a second output beam.

After passing through the prism 11 the input polarized light beam passes through a quarter wave retardation plate 12 located in the input light tube. The quarter wave retardation plate 12 comprises a medium of birefringent or doubly refracting material which divides an incident light beam plane polarized at 45° to the optic axis of the plate into two beams of equal intensity but with slightly different velocities within the retardation plate. The optical characteristics of the retardation plate are carefully selected so that the more retarded beam is one quarter cycle out of phase from the less retarded beam. The retardation plate 12 has a crystal axis which is placed at an angle theta (FIG. 1) to the transmission axis of the prism 11. For most purposes it is preferred that the angle theta be 45° and can be either to the right or to the left of the polarizer axis. If at an angle other than 45°, elliptical polarization of the light occurs since the more retarded and less retarded beams are of unequal intensity.

It is preferable in constructing the quarter wave retardation plate for use in the practice of this invention to employ optically flat quartz because of its low index of refraction. However, for quartz transmitting light of wave length 6328 Angstroms a thickness of $1.75 \times 10^{-2}$ millimeters is required to get a 90° phase shift. Since it is not practical and nearly impossible to make a reasonably size optically flat quartz plate with the above indicated thickness, it is preferred to construct the retardation plate employing two optically flat quartz plates 12a and 12b of thickness $t_a$ and $t_b$ respectively wherein one plate has its optic axis oriented 90° to the optic axis of the other plate. The thicknesses of the two plates are such that $t_a - t_b$ equals $1.75 \times 10^{-2}$ millimeters. For good operation of the retardation plate the angle between the optic axes of the two quartz pieces should be at $90° \pm 5 \times 10^{-3}$ radians. These axes should each be at 45° from the plane of polarization of the light from the polarizer. For the gas laser identified above it has been found that a retardation plate having a diameter of about ten millimeters and a total thickness of about 4.2 millimeters is satisfactory for good operations. It will also be apparent to one skilled in the art that other doubly refracting materials, split mica or certain plastic films can advantageously be employed in constructing a circular polarizer.

In order to further minimize random fluctuations in the intensity of the laser, conventional anti-reflection coatings are applied to the surfaces of the polarizer and the quarter wave plate in order to minimize reflection from these sources. These anti-reflection coatings reduce the amount of light returning to the laser from this source by a factor of greater than 100.

There is next provided on the optic axis of the input light tube 23 a focusing lens 13. A conventional lens of suitable focal length is employed for focusing the light beam. The focal length is such that the entering collimated beam is focused on the signal transducer 15.

Also provided on the housing 21 is an output collimating tube 24 including an output collimating lens 16 (not shown in FIG. 2) substantially identical with the input focusing lens 13, and positioned so that the diverging beam from the transducers 15 is collimated.

In the light tight enclosure of the housing 21 there is provided a platform 26 (FIGS. 2-5) which is located in the housing by a centrally positioned pin 27 closely engaging a hole 28 in the platform. The platform can be pivotally moved on the pin 27 so as to align the transducers 15 exactly on the optic axis of the light input tube 23 and when properly adjusted the platform is bolted securely to the housing. On the platform 26 there is mounted a beam splitter 14 which is preferably a cube of quartz having a beam splitting plane 25 giving exactly equal transmission and reflection of light of the wave length of interest. Since the light is circularly polarized, equal transmission and reflection are more readily obtained than would be the case with plane polarized light from the laser mentioned above. As shown in FIGS. 6 and 7 the beam splitter 14 is fixed to a circular base 29 which is preferably also of quartz. The circular base or disk is secured to the platform 26 by a clamping ring 30 which is bolted to the platform. Although a cubic beam splitter is preferred for minimizing optical aberrations, it will be apparent to one skilled in the art that a flat plate beam splitter or the like could also be advantageously used in the practice of this invention.

Mounted on the platform 26 are two substantially identical pedestals 33, only one of which will be described in detail. Each of these pedestals has a cylindrical body 34 which is positioned between a V-groove 35 in the platform and a corresponding V-groove 36 in a clamping block 37. This permits pivotal or rotational adjustment of the pedestal as hereinafter described. To facilitate rotational adjustment, flats 38 are provided on the pedestal body to permit adjustment even when the V-block 37 is fairly tightly clamped to the platform and the pedestal is subject to considerable friction. This is of assistance in fine adjustment.

As is shown in somewhat greater detail in FIGS. 8 and 9 the pedestal has an assembly of piezoelectric transducer elements comprising a bias transducer assembly 39 and a signal transducer 15. The bias transducer assembly 39 comprises a series of disks of piezoelectric material 42 having thin metal layers 43 on opposite sides thereof so that an electric field can be applied across each disk (FIG. 10). The disks of piezoelectric material are preferably of a generally circular shape with two asymmetrically located ears 44 thereon. The piezoelectric disks are fabricated so that the application of an electric field between the two faces of the disk causes a change in the thickness of the disk. The disks have identical polarity so that a positive increase in voltage in one direction will, for example, cause an increase in thickness. The bias transducer assembly 39 has alternate disks inverted so that the polarity of alternate disks is opposite. A stack of disks so assembled has no overall change in dimension when a voltage is applied across the entire stack, since the increase in thickness of one disk is offset by the decrease in thickness of the adjacent disk. However, when a voltage is applied to each individual disk with a polarity corresponding to the polarity of the disk, a substantial dimensional change is obtained in the stack. The bias transducer assembly is therefore fabricated so that alternate pairs of adjacent metal layers 43 are interconnected electrically. Application of a voltage to the interconnection then applies a voltage of opposite polarity on alternate disks in the assembly, and the resultant dimensional changes are summed. Thus, the piezoelectric elements of the bias transducer are electrically connected in parallel, but mechanically connected in series so that a much lower voltage is required for a given mechanical displacement than is required for a transducer having but one piezoelectric element. The two bias transducer assemblies 39 are also driven in opposite phase by suitable electrical or polarity arrangements in order to minimize the displacement required of either assembly alone.

The invention of alternate disk 42 in the bias transducer assembly also staggers the ears 44 so that electrical connection can be made to the metal layers 43 thereon without severe hindrance. Each metal layer 43 has an electrical lead 45 attached thereto, preferably by spot welding or thermo-compression bonding of the fine wire 45 to the thin metal layer 43. In order to obtain maximum reliability, all metal layers have electrical leads, even though adjacent layers need not both have leads. Additionally it is desirable to have leads to each ear since a thin layer of adhesive which is between the adjacent metal layers may interfere with electrical contact therebetween, thereby slightly diminishing the total displacement available from the bias transducer. This effect is avoided by employing a conductive adhesive.

At the end of the bias transducer assembly 39 there is provided a signal transducer 15 illustrated in FIGS. 11 and 12 which comprises a small piezoelectric disk 46 having thin metal layers 47 on opposite sides thereof. Since the piezoelectric disk 46 in a preferred embodiment is about 0.13 inch in diameter and .004 inch thick, it is preferably cemented to a ceramic disk 48 which is conveniently employed in handling the small signal transducer. It is preferred that this disk be constructed of the same material as the piezoelectric transducer, but unpolarized, to minimize thermal stresses. A layer of conductive material 49 is provided on a surface of the ceramic disk for attachment of an electrical lead 17 thereto. The conductive material can be metal or more conveniently a conductive fused glass-metal combination which also serves as an adhesive. The layer 49 and the metal layer 47 on the signal transducer permit the application of a rapidly varying electric field across the signal transducer for transmitting information. An electrical lead 17 is secured to the metal layer 47 on the exposed face of the signal transducer 15. This lead is welded or bonded near the edge of the layer so that the central region remains reflective. The signal transducer 15 is cemented to the ceramic disk 48 which is in turn cemented to the bias transducer assembly 39. The assembly is centered on the pedestal so that the reflective metal layer 47 on the exposed face of the signal transducer is located in the focal plane of the focusing lens 13 and on the optic axis of the instrument. The described metal layers are preferably gold applied by vacuum deposition, and a preferred piezoelectric material comprises lead zirconium titanate. Gold so applied is a good mirror surface on the signal transducer as well as a good electrical conductor.

Four insulated posts 51 are provided on the pedestal 33 as shown in FIG. 8 for conducting electrical signals to the transducers. Two of these posts 51 have electrical leads 45 attached thereto for applying an electric field across the piezoelectric disks 42 of the bias transducer assembly 39 and two of the posts have electrical leads 17 attached thereto for applying a varying electric field across the signal transducer 15. The posts are electrically connected to conventional electrical connectors 52 for attachment to conventional bias voltage generators and signal generators.

A signal generator 53 (FIG. 1) is electrically connected to the signal transducers for applying a signal voltage thereto. The signal voltage generator is, for example, a conventional television camera which provides an electrical signal that carries information about the scene viewed. Amplifying and applying this signal to the signal transducers results in a light beam that is amplitude modulated with a signal related to the scene viewed. This optical signal is readily detected by conventional photodetectors and demodulated to form a television picture. Similarly, other varying electrical signal generators can be used in conjunction with the described optical modulator, such as, for example, a microphone and amplifier for audio frequency information. For some uses of the optical modulator a conventional oscillator is employed so that a sinusoidally varying output light beam is generated. Other signal generators can be employed as desired for other uses of the modulator.

The output of the photodetector 18 is fed to a feedback control circuit (FIG. 13) that controls the bias voltage on the bias transducers 39. Optimum operation of the interference modulator as an amplitude modulator is obtained when the mean difference between the path lengths of the two interferometer legs is halfway between maximum destructive interference and maximum constructive interference. The variation in path length caused by the signal transducers swings on either side of this mean position and it is preferred that the swing be less than the swing needed to cause complete interference. This condition provides the maximum linearity of the amplitude modulated light beam. A bias voltage amplifier 59 provides a steady voltage of suitable magnitude that is electrically connected to the bias transducers 39 for adjusting them to the optimum position so that the mean difference in path lengths is halfway between maximum constructive and maximum destructive interference. Because of slight variations in geometry of the interferometer due to temperature gradients and the like, some drift from the optimum position is found during operation of the interferometer. The voltage generated by the bias voltage amplifier is adjusted to maintain maximum linearity in the signal obtained from the photodetector 18. It has been found that variations in linearity are small and slow. It will be understood that adjustment of the bias voltage amplifier can be manual if desired, and in this instance, any conventional D.C. voltage supply capable of controlled output is suitable for use as the bias voltage generator. By using a bias transducer assembly as described the voltage required is less than 100 volts.

FIG. 13 illustrates a bias stabilization feedback network employed with the described optical modulator for controlling the voltage on the bias transducers. Interposed between the laser 10 and the optical isolator 11, 12 is a beam splitter 60 which diverts a small proportion of the light from the laser to a reference photodetector 61 such as a photomultiplier tube or vacuum diode which converts the diverted light into an electrical signal. Preferably about 1% or less of the light from the laser is diverted by the beam splitter 60 to provide a reference signal. The rejected light beam from the optical isolator composed of the Foster-Seeley prism 11 and quarter wave plate 12 is directed to a photodetector 18. The electrical signals from the two photodetectors 18 and 61 are smoothed and amplified by low pass filter-amplifiers 62. The smoothed output of the reference photodetector 61 is appropriately attenuated by a bias adjustment 63 which is manually set to obtain optimum modulator operation. The bias reference voltage from the bias adjustment 63 is compared with the signal from the photodetector 18, representing the modulator's average modulation level, by a different network 64. The difference between the signals from the bias adjust 63 and the photodetector 18 provides an error signal for a D.C. chopper amplifier 20 having an output that is applied across the bias transducers 39. Thus the D.C. output of the amplifier in this arrangement provides the transducer bias.

The closed loop bandwidth of such a feedback system is about one hundred cycles per second and the dynamic range of the bias stabilizer is sufficient to vary the pathlength difference in the modulator by more than one and one-half wave lengths The intensity of light rejected by the optical isolator provides a measure of the mean operating position of the modulator. Any variation in the output from the laser is compensated for in the reference photodetector 61 so that the bias stabilization network illustrated compensates only for variations occurring in the modulator itself. Basically the system provides that the average light output from the modulator is a selected proportion of the output from the laser.

The arrangement of mechanical and optical elements in the interferometer light modulator is employed for rapid and accurate alignment of the instrument. In order to obtain alignment of the instrument a collimated light beam such as, for example, from a laser, is directed into the modulator through the input light tube and the optical elements therein. Minor adjustments of the position of the focusing lens 13 can be made so that the beam is sharply focused on one of the signal transducers 15. If necessary the platform 26 can be pivoted for alignment of the transducers on the optic axis of the focusing lens. The beam splitter 14 which divides the focused light beam into two beams with paths of similar length is placed on the platform on the optic axis of the focusing lens 13. Each of the two beams formed by the beam splitter is focused on one of the signal transducers 15.

Because of tolerance involved in the manufacture and assembly of the various elements of the modulator, the beam of light reflected from a signal transducer 15 may not be exactly coincident with the incident beam, and unless compensated for, the recombined beams would diverge. The reflected beam may have a slight angular difference from the incident beam and this angle can be in any position around the incident beam. Means are provided for swinging the reflected beam from each transducer into a common plane.

The arrangement of a cylindrical body 34 on the pedestals 33 in a pair of V-grooves 35 and 36 is provided for pivotal adjustment of the entire pedestal assembly. By rotating the pedestal by means of the flats 38 thereon any angular deviation of the reflected light beam is rotated so as to lie in a common plane including the input focusing lens 13, the output collimating lens 16 and the signal transducer 15. Each of the pedestal assemblies is adjusted in this manner so that all of the light beams, incident and reflected, are in a common plane, the plane of the paper in FIG. 2.

Adjustment of the beam splitter 14 then superimposes the two reflected beams for optimum interference. This adjustment is readily accomplished by rotating the beam splitter in the circular clamping ring 30 until the beam splitting plane 25 exactly bisects the angle between the normals to the signal transducer surfaces. In this condition even though there may be a slight deflection of the light beam directed to the signal transducer because of refraction by the beam splitter this deflection is canceled in the reflected beam so that the two reflected beams are exactly superimposed by the beam splitter. Thus although the optical elements may not be geometrically exactly aligned, they are optically aligned so that a properly directed light beam interacts with each optical element in turn.

The condition of exact superposition of the two light beams is readily observed by noting the maximum interference obtained in an output light beam from the modulator either from the output light tube or preferably with the photodetector 18 monitoring the reflected light beam. After adjusting the angle of the beam splitter 14 this unit is securely clamped to the platform 26 by the clamping ring 30. A preferred method of observing the maximum interference obtained is to apply a varying voltage across the signal transducer to cause changing interference in the recombined light beam. For this purpose a conventional oscillator operating at a few thousand cycles per second along with a high voltage amplifier is preferably employed as the signal generator. The variation in light intensity is readily observed in the output of the photodetector with a conventional oscilloscope. Adjustment of the pedestals and beam splitters is made as described to obtain the maximum depth of modulation.

The optical modulator is operated by passing a collimated light beam from the laser 10 through the Foster-Seeley prism 11 and through the quarter wave retardation plate 12. This combination effects a circular polarization of the light in the interferometer. The collimated light beam is focused by the focusing lens 13 into a sharp image on the signal transducers 15. The beam splitter 14 in the optical path splits the focused light beam into two equal beams each of which impinge on one of the signal transducers. The light is reflected from the signal transducers and recombined in the beam splitter 14 to give an output beam which is directed through the collimating lens 16 and a second beam which is redirected through the focusing lens 13. The redirected circularly polarized beam 13 is plane polarized by the quarter wave retardation plate 12. The plane of polarization of this reflected beam is normal to the plane of polarization of the original collimated beam from the laser. It is therefore rejected by the Foster-Seeley prism and passed out of the light modulator through the retardation plate 58. This rejected light, when used for providing bias stabilization feedback, then passes to the photodetector 18 where it is converted to an electrical signal having a magnitude proportional to the intensity of the rejected light.

By employing the optical isolator as described to prevent reflection to the laser, stable operation of the laser is obtained. Intensity fluctuations previously noticed are no longer observed and the amplitude modulated output beam from the optical modulator is improved. Good signal to noise ratio is obtained since noise from the laser is eliminated.

The recombined light beam transmitted through the collimated lens 16 is formed into a collimated beam which is transmitted an arbitrary distance to suitable receiving apparatus.

Since both recombined light beams are similarly amplitude modulated, both can be used for transmitting information. The beam deflected by the Foster-Seeley prism is of slightly poorer quality and intensity since it is transmitted and reflected by additional optical elements. This diverted amplitude modulated light beam may be usefully employed, for example, for redundant transmission of information to suitable receiving apparatus or for transmitting identical information to more than one receiver. When so used, the photodetector is removed from the light path and the collimated beam transmitted to suitable receivers, and if desired, a small amount of light may be split from one of the transmitted beams to provide feedback for proper bias adjustment.

The two light beams from the beam splitter 14 traverse substantially equal length paths between the beam splitting plane 25 and the signal transducer 15 and when recombined undergo constructive or destructive interference. The electric field on the bias transducer assembly 39 is adjusted so that the interference is approximately halfway between the maximum constructive interference and the maximum destructive interference. A varying electric signal is applied to the signal transducers 15 to cause a displacement thereof about the mean position to which they are adjusted by the bias transducer 39. As the electric field on the signal transducer varies, the relative path lengths of the two light beams vary and the recombined light beams oscillate between constructive and destructive interference in response to the electric field. For amplitude modulation it is preferred that the amplitude of oscillations in dimensions of the signal transducers be sufficiently small that complete constructive or destructive interference is avoided. By operating between these limits good linearity of amplitude modulation is obtained.

Any random slow variation in the path lengths of the two interferometer legs may cause a decrease in linearity of the modulated light beam. Since the retrodirected light beam detected by the photodetector 18 is identical to the output light beam except opposite in phase, variations from good linearity are readily detected and adjustment of the bias transducers made so that the modulator operates in an optimum condition.

Likewise the modulator is also employed as a polarization modulator where the state of polarization of the light beam conveys information. The output beam of light from the output lens 16 of the modulator is circularly polarized with a handedness determined by the retardation plate 12. The output light beam from the prism 11 is circularly polarized by the retardation plate 58 in a handedness opposite to that of the other output light beam. As previously mentioned, the amplitude of one output light beam is increased when the other is decreased by a proportional amount, hence, information is transmitted by means of the relative amplitudes of the two beams of opposite polarization in the same manner as the amplitude of either beam alone. This type of transmission has a distinct advantage over amplitude modulation of a single beam since the relative amplitudes of two superimposed beams is unaffected by atmospheric effects which may affect the absolute amplitude of the light. This permits information transmission with greatly improved signal to noise ratio. It is preferred that the two beams be superimposed for transmission and separated at the receiver so that both undergo the same atmospheric effects and are similarly attenuated, hence do not change in relative intensity.

When employed as a polarization modulator, digital information is readily transmitted by the described and illustrated apparatus. Digital information is conventionally in the form of two mutually exclusive states, conditions, digits or the like and information is transmitted by means of a sequence of such alternative conditions. The handedness of circularly polarized light is a convenient unambiguous means for imposing digital information on a light beam, right handed polarization representing one condition and left handed polarization the other.

When the signal on the signal transducers is of sufficient magnitude, the path length difference in the interferometer swings between complete destructive and complete constructive interference. Since the amplitude of one output light beam is maximized when the other beam is minimized, by applying a signal of this magnitude to the signal transducers the output light beams are alternatively selected. The two beams are superimposed for information transmission and the handedness of polarization indicates which beam is active, thereby transmitting digital information. This mode of information transmission is highly advantageous for some purposes since the handedness of polarization is insensitive to atmospheric turbulence and the like which may contribute noise to amplitude modulated signals.

It will be recognized by one skilled in the art that instead of circularly polarizing the two output beams, both can be plane polarized in mutually perpendicular planes for transmitting information. Care is required, however, to avoid the effects of Faraday rotation of light due to the earth's magnetic field. Circularly polarized light is unaffected and is preferred. To obtain two orthogonal plane polarized beams, it is only necessary to place the quarter wave retardation plate in the path of the output beam from the collimating lens rather than in the beam from the prism.

A circularly polarized modulated beam is readily demodulated by a receiver employing, for example, a quarter wave retardation plate, a birefringent prism for separating an ordinary and extraordinary light beam and photodetector means for sensing the relative magnitudes of the two separated beams. When the modulator is employed for conveying digital information, the bias transducers are adjusted so that the swing of the signal transducers is between maximum constructive interference and maximum destructive interference. If desired, a small portion of one of the output light beams may be split out to provide feedback for bias voltage adjustment.

It is understood that the above described embodiment is merely illustrative of the application of the principles of this invention. Those skilled in the art may readily devise other variations that will embody the principles of this invention. It is therefore to be understood that within the scope of the appended claims the invention may be practiced otherwise than as specifically described.

What is claimed is:

1. A stable source of coherent light comprising:
   a continuous wave laser for generating an output beam of coherent light;
   means for utilizing the output beam and concomitantly retrodirecting a portion of the output beam towards said laser; and
   means interposed between said means for retrodirecting and said laser for preventing reflected components of the beam of coherent light retrodirected towards said laser from reentering the lasing cavity of said laser, whereby reflected components of the beam are restricted from interfering with light in the laser and causing intensity fluctuations of the laser.

2. A stable source of coherent light as defined in claim 1 wherein said means for preventing reflected light from reentering said laser comprises:
   means optically aligned with said laser for plane polarizing the output beam of light; and
   means optically aligned with said means for plane polarizing for circularly polarizing the output beam of light.

3. A steady source of coherent light as defined in claim 1 wherein said means for preventing reflected light from reentering said laser comprises:
   a prism of doubly refracting material for plane polarizing the output beam of light; and
   a quarter wave retardation plate having an optic axis at 45° to the plane of polarization of the output beam of light.

4. a stable source of coherent light as defined in claim 1 wherein said means for preventing reflected light from reentering said laser comprises:
   a prism assembly of doubly refracting material for transmitting a first beam of plane polarized light in one direction and for transmitting a second beam of light plane polarized normal to the first beam of light in a second direction; and
   a serial assembly of two optically flat plates of doubly refracting material having their optic axes mutually angulated at 90 degrees said optic axes each being at 45 degrees to the plane of polarization of the first beam of light, said plates having a relative thickness for retarding one polarized component of the first beam of light by one quarter wavelength relative to another polarized component of the first beam of light.

5. An optical apparatus comprising:
   laser means including a laser cavity for generating a continuous wave beam of coherent light;
   means optically aligned with said laser means and external to said laser cavity for controlling the beam of light including means reflecting at least part of said beam towards said laser means; and means interposed between said means for controlling and said laser cavity for preventing the reflected part of the light beam from returning to said laser cavity, whereby intensity fluctuations in the laser output are minimized.

6. An optical apparatus comprising:

laser means including a laser cavity for generating a continuous wave laser beam of coherent light;

output means external to said laser cavity and responsive to a signal for providing a first output beam including means reflecting at least part of said laser beam towards said laser means; and means external to said laser cavity for diverting the reflected part of said laser beam to provide a second output beam.

7. An optical apparatus comprising:

laser means for generating a continuous wave laser beam of coherent light;

an interference modulator that gives a first amplitude modulated output beam for conveying information and a second amplitude modulated output beam superimposed on said laser beam; and prism means interposed between said laser means and said interference modulator for diverting the superimposed second output beam from said laser beam to provide a second amplitude modulated output beam for conveying information.

8. An optical modulator comprising:

a prism assembly of doubly refracting material for transmitting a first beam of polarized light in one direction and for transmitting a second beam of light polarized normal to the first beam of light in a second direction;

first and second quarter wave retardation plates aligned in said first and second directions respectively for circularly polarizing the first and second light beams from said prism assembly with opposite handedness; and an optical interferometer aligned with said prism assembly for alternatively effecting constructive and destructive interference of said first light beam; and simultaneously effecting destructive and constructive interference respectively of said second light beam.

9. An optical modulator comprising:

a laser for generating a laser beam of coherent light;

modulating means for amplitude modulating the laser beam for providing an output signal beam and an output control beam;

means responsive to the laser beam for providing a reference signal; and means responsive to said reference signal and said control beam for biasing the modulating means.

10. An optical modulator comprising in optical alignment:

a laser for generating a laser beam of coherent light;

a beam splitter for diverting a part of the laser beam;

a photodetector for converting the diverted part of the laser beam to a first electrical signal;

an electrically actuated interferometer for separating the balance of the laser beam into first and second oppositely phased modulated light beams including means for projecting said first beam;

means interposed between said beam splitter and said interferometer for diverting said second beam;

a photodetector for converting the diverted second beam into a second electrical signal; and feedback means for comparing the first and second electrical signals and regulating said interferometer in response thereto.

11. An optical modulator comprising in optical alignment:

means for plane polarizing an input beam of light;

means for converting the plane polarized beam of light to a circularly polarized beam of light having a first handedness;

a beam splitter for splitting the circularly polarized beam of light into two substantially equal components; and electrically actuated transducer means for reflecting the two components of the circularly polarized beam of light to said beam splitter means and concomitantly reversing the handedness of polarization, said transducer means and said beam splitter means forming ends of separate paths of controllably variable length for the two components of the circularly polarized beam of light;

said beam splitter being positioned relative to said transducer means for recombining the reflected components of the circularly polarized beam of light for optical interference therebetween and providing first and second output beams with one of said output beams being directed towards the input beam.

12. An optical modulator comprising in optical alignment:

a laser for generating a continuous wave beam of coherent light;

a polarizer for plane polarizing the light beam;

a quarter wave retardation plate for converting the plane polarized light beam to a circularly polarized light beam;

a focusing input lens;

a beam splitter for splitting the light beam into first and second substantially equal components;

first and second reflective transducers at the focal plane of said focusing input lens for reflecting said first and second components respectively to said beam splitter for recombination into first and second output beams, said first output beam being directed toward said retardation plate; and a collimating output lens for projecting said second output beam.

13. An optical modulator as defined in claim 12 wherein said polarizer comprises a prism assembly of doubly refracting material; and said quarter wave retardation plate comprises a serial assembly of two flat plates of doubly refracting material having their optic axes mutually angulated at 90 degrees and having a relative thickness to produce a phase shift in the beam of light of 90 degrees.

14. An optical modulator comprising in optical alignment:

a combination as defined in claim 2 wherein said means for retrodirecting comprises:

a focusing input lens;

a beam splitter for splitting the circularly polarized beam of light into two substantially equal components and for recombining reflected components of the circularly polarized light for optical interference therebetween;

first and second piezoelectric signal transducer means for reflecting the two components respectively of the circularly polarized beam of light to said beam splitter and concomitantly reversing the handedness of polarization thereof;

said transducer means and said beam splitter forming ends of separate paths for the two components of the circularly polarized beam of light;

said signal transducer means being responsive to a rapidly varying electric signal for controllably varying the path length between said transducer means and said beam splitter, and bias transducer means supporting said signal transducer means for adjusting the length of a light path between said beam splitter and said signal transducer means.

15. An optical modulator comprising in optical alignment:

a continuous wave gas laser for generating an output beam of coherent light of a selected wave length;

a prism assembly of doubly refracting material for transmitting a first beam of plane polarized light in one direction and for transmitting a second beam of light plane polarized normal to the first beam of light in a second direction;

an assembly of two optically flat plates of doubly refracting material, having their optic axes mutually angulated at 90 degrees, said optic axes each being at 45 degrees to the plane of polarization of the first beam of light; said plates having a relative thickness for retarding one polarized component of the first beam of light by one quarter wave length relative to another polarized component of the first beam of light to form a beam of circularly polarized light;

a beam splitter for splitting the circularly polarized beam of light into two substantially equal components and for recombining reflected compounds of the circularly polarized light for optical interference therebetween;

first and second piezoelectric signal transducer means for reflecting the two components respectively of the circularly polarized beam of light to said beam splitter and concomitantly reversing the handedness of polarization thereof;

said signal transducer means and said beam splitter forming ends of separate paths for the two components of the circularly polarized beam of light;

said signal transducer means being responsive to a rapidly varying electric signal for controllably varying the path length between said transducer means and said beam splitter; and bias transducer means supporting said signal transducer means for adjusting the length of the light path between said beam splitter means and said signal transducer means in response to variations in amplitude of the second beam of light.

16. An optical modulator as defined in claim 15 further comprising:

a quarter wave retardation plate aligned with said prism assembly for circularly polarizing the second beam of light after passage through said prism assembly.

17. An optical modulator as defined in claim 15 wherein said bias transducer means comprises a piezoelectric bias transducer;

means for generating a bias voltage for said piezoelectric bias transducer;

a photodetector responsive to the second beam of light transmitted from the prism assembly; and means responsive to the photodetector controlling the means for generating a bias voltage.

References Cited

UNITED STATES PATENTS

| | | | |
|---|---|---|---|
| 3,202,052 | 8/1965 | Rambauske et al. | 350—163 |
| 3,230,475 | 1/1966 | Koester et al. | 331—94.5 |
| 3,233,108 | 2/1966 | Rosenblum. | |
| 3,277,393 | 10/1966 | Nicolai | 331—94.5 |
| 3,302,027 | 1/1967 | Fried et al. | 250—199 |
| 3,302,028 | 1/1967 | Sterzer | 350—150 |

OTHER REFERENCES

Shurcliff, "Polarized Light," Harvard University Press, Cambridge, Mass., 1962, pp. 102–106.

Collins and White, "Interferometric Laser Mode Selector," from Lasers and Applications, edited by W. S. C. Chang, Engineering Experiment Station. The Ohio State University Columbus, Ohio, 1963, p. 97.

DAVID SCHONBERG, *Primary Examiner.*

PAUL R. MILLER, *Assistant Examiner.*

U.S. Cl. X.R.

350—157, 160, 163; 331—94.5; 356—110; 250—199